No. 651,796.  
J. A. CRANDALL.  
TWINE CUTTER.  
(Application filed Sept. 27, 1899.)  
Patented June 12, 1900.
(No Model.)
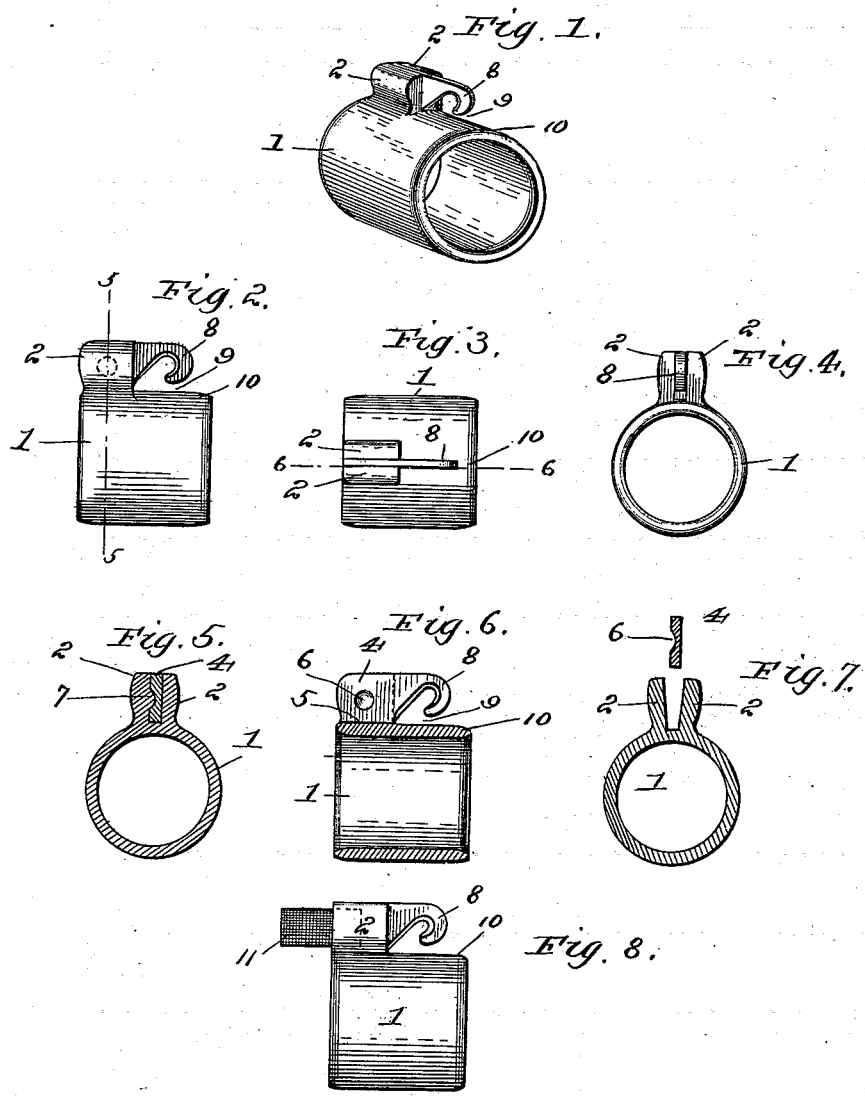

UNITED STATES PATENT OFFICE.

JESSE A. CRANDALL, OF NEW YORK, N. Y., ASSIGNOR TO STEPHEN V. WHITE, OF SAME PLACE.

TWINE-CUTTER.

SPECIFICATION forming part of Letters Patent No. 651,796, dated June 12, 1900.

Application filed September 27, 1899. Serial No. 731,843. (No model.)

*To all whom it may concern:*

Be it known that I, JESSE A. CRANDALL, a citizen of the United States, and a resident of the borough of Brooklyn, city of New York, State of New York, have invented certain new and useful Improvements in Twine-Cutters, of which the following is a specification, reference being had therein to the accompanying drawings, in which—

Figure 1 is a perspective view. Fig. 2 is a side elevation. Fig. 3 is a plan view. Fig. 4 is an end view. Fig. 5 is a sectional view on line 5 5 of Fig. 2. Fig. 6 is a sectional view on line 6 6 of Fig. 6. Fig. 7 is a sectional view showing the cutter and the ring before the cutter is secured in place, and Fig. 8 is a view showing a modification.

The object of this invention is to provide a twine-cutter adapted to be worn on the finger and provided with a peculiarly-shaped cutter, which will be protected from injury and will not accidentally catch into and injure the clothes or the person of the user, and also to provide means for rigidly holding said cutter to the ring, so that it will not be pulled out or become loose.

Referring to the various parts by numerals, 1 designates the cylinder, which is of malleable metal and is made broad to give a broad bearing on the finger to prevent cutting it during the use of the device. Formed on one end of the cylinder is a radial boss, which comprises two parallel wings 2, which extend longitudinally of the cylinder and are separated to form a recess between them. Into this recess fits the broad end 4 of the cutter-blade, which is formed with the straight inner edge 5, which fits closely against the outer surface of the cylinder between the wings 2, and with the central recess or depression 6. When the cutter-blade has been placed between the wings 2, said wings are compressed onto said blade, and the metal of one wing is forced into the recess 6 to form a projection 7. When the blade has been clamped in place, the straight inner edge bearing squarely against the outer surface of the cylinder and the projection on the wing entering the recess in the blade squarely holds the blade and prevents its working loose under the constant jerking action of cutting twine and heavy cord. The blade projects from between the wings toward the other end of the cylinder and is formed into a hook-shaped cutter 8, which is curved inward and backward toward the wings, its inner end approaching closely to the outer surface of the cylinder to form a narrow twine-passage or throat 9. The outer edge of the blade, from the wings to the point of the hook, is square or blunt, and the cutting edge is formed entirely within the hook, extending from the point of the hook to the wings, whereby it will be necessary to pass the twine through throat 9 and entirely within the curved portion of the hook before it can be cut. The inner end of the hook approaches the outer surface of the cylinder so closely that the twine-passage between them is just large enough to permit a medium-sized twine to pass through into the hook. Beyond this throat the twine-space is much enlarged to insure the twine leaving the throat, the point of the hook serving to prevent the twine readily passing out through the throat and insuring its engagement with the cutting edge. The end of the cutter terminates short of the end 10 of the cylinder, so that the cylinder protects it from injury and prevents its catching into clothing, &c., and this end portion of the cylinder forms a guiding-surface upon which the twine may be placed in order to readily pass it through the throat or twine-passage 9.

In Fig. 8 the cutter is provided with a rubber eraser 11, which is secured between the wings 2 and projects beyond the end of the ring in the opposite direction from the cutter-blade. This eraser may or may not be employed.

It will be seen that the blade cannot become loosened and that when the device is not in use it may be carried about in the pocket without any danger of its being accidentally caught therein and cut.

It will be observed that instead of forming the recess 6 in the blade it may be formed in the inner surface of one of the wings and a projection be formed on the blade to enter said recess when the wings are clamped upon the blade.

Having thus fully described my invention, what I claim, and desire to secure by Letters Patent, is—

1. In a twine-cutter, the combination of a cylinder of malleable metal formed with two parallel radial wings separated to form a space between them, a cutter-blade formed with a recess and clamped between said wings, a portion of the metal of one of said wings entering the recess, in the cutter-blade.

2. In a twine-cutter, the combination of a cylinder of malleable metal formed with two parallel radial wings separated to form a space between them, the bottom of the space being straight, and a cutter-blade formed with a straight edge, abutting against the straight bottom of the recess between the wings, and with a recess, a portion of the metal of one of the wings entering said recess.

3. In a twine-cutter, the combination of a cylindrical part formed with a divided radial boss, a cutter-blade secured between the divided parts of said boss and extending longitudinally of the cylindrical part, one end of the said blade projecting beyond the boss and terminating in an inward-extending hook whose inner end approaches close to the cylindrical part leaving only a narrow twine-passage between said hook and said cylindrical part, the cutting part of the blade being entirely within the hook.

4. In a twine-cutter, the combination of a cylindrical part, a cutter-blade secured to one end of the cylindrical part and extending longitudinally thereof, said cylindrical part projecting beyond the projecting end of the blade to protect it and to form the twine-guiding surface, the projecting end of the blade terminating in an inward-extending hook whose inner end approaches close to the cylindrical part forming a narrow twine-passage, the cutting portion of the blade being entirely within the hook.

5. A twine-cutter consisting of a cylinder having a blade secured to it at one end, said blade provided with a cutting edge and extending toward the opposite end of the cylinder and terminating short of it.

6. A twine-cutter consisting of a cylinder adapted to be carried on the finger and provided with a blade, said blade being attached at one end to the cylinder and having its other end extending toward the other end of the cylinder, this extended end being provided with a cutting-hook turned inward and backward toward the point of attachment of the blade to the cylinder, the cutting edge being entirely within the hook and the end of the hook lying near the external surface of the cylinder at a point between the ends of the cylinder, thereby forming a non-cutting twine-passage between the outer surface of the cylinder and the adjacent, blunt edge of the hook, substantially as set forth.

7. In a twine-cutter, the combination of a ring or cylinder provided with a pair of radial wings, a cutter-blade inserted between the wings, said wings being clamped upon the cutter-blade, the clamping-face of one of the parts being provided with a recess into which projects a part of the adjacent face of the other part, as and for the purposes set forth.

In testimony whereof I hereunto affix my signature, in the presence of two witnesses, this 31st day of August, 1899.

JESSE A. CRANDALL.

Witnesses:
GRAHAM K. ANDERSON,
PERCY G. B. GILKES.